US008062620B2

(12) United States Patent
Dogterom et al.

(10) Patent No.: US 8,062,620 B2
(45) Date of Patent: Nov. 22, 2011

(54) CATALYTIC PROCESS FOR THE CONVERSION OF CO (II)HYDROXIDE IN CO (III)OXIDEHYDROXIDE

(75) Inventors: Ronald Jan Dogterom, Amsterdam (NL); Heiko Oosterbeek, Amsterdam (NL); Marinus Johannes Reynhout, Amsterdam (NL)

(73) Assignee: Shell Oil Company, Houston, TX (US)

( * ) Notice: Subject to any disclaimer, the term of this patent is extended or adjusted under 35 U.S.C. 154(b) by 391 days.

(21) Appl. No.: 11/791,574

(22) PCT Filed: Nov. 28, 2005

(86) PCT No.: PCT/EP2005/056263
§ 371 (c)(1),
(2), (4) Date: May 24, 2007

(87) PCT Pub. No.: WO2006/056610
PCT Pub. Date: Jun. 1, 2006

(65) Prior Publication Data
US 2008/0051474 A1  Feb. 28, 2008

(30) Foreign Application Priority Data

Nov. 29, 2004 (EP) .................................. 04106157

(51) Int. Cl.
*C01G 51/02* (2006.01)
(52) U.S. Cl. ......... 423/594.19; 423/22; 423/50; 423/58; 423/65; 423/66; 423/71; 423/140; 423/141; 423/142; 423/594.5; 518/715
(58) Field of Classification Search .............. 423/22, 423/50, 58, 65, 66, 71, 140–142, 594.19, 423/594.5; 518/715
See application file for complete search history.

(56) References Cited

U.S. PATENT DOCUMENTS

| 2,793,936 | A | | 5/1957 | Voos ................................ 23/183 |
| 4,844,948 | A | * | 7/1989 | Nakahori et al. .......... 427/126.3 |
| 4,960,801 | A | | 10/1990 | Iglesia et al. ................... 518/715 |
| 5,264,404 | A | * | 11/1993 | Takahama et al. ................. 502/5 |
| 6,130,184 | A | * | 10/2000 | Geerlings et al. ............. 502/350 |
| 7,384,706 | B2 | * | 6/2008 | Suhara et al. .................. 429/223 |
| 2004/0028694 | A1 | * | 2/2004 | Young et al. ............... 424/190.1 |

FOREIGN PATENT DOCUMENTS

| AU | 2005308788 | | 6/2006 |
| EP | 071770 | | 2/1983 |
| EP | 167215 | | 1/1986 |
| EP | 168894 | | 1/1986 |
| EP | 178008 | | 4/1986 |
| EP | 363537 | | 4/1990 |
| EP | 398420 | | 11/1990 |
| EP | 0455307 | | 11/1991 |
| EP | 0455308 | | 11/1991 |
| EP | 0510771 | | 10/1992 |
| EP | 0510772 | | 10/1992 |
| FR | 2374956 | | 7/1978 |
| JP | 4078419 | | 3/1992 |
| JP | 7023524 | | 1/1995 |
| SU | 1518306 | | 10/1989 |
| WO | WO9702214 | | 1/1997 |
| WO | WO9934917 | | 7/1999 |
| WO | WO0139882 | | 6/2001 |
| WO | WO 2004/092073 | * | 10/2004 |

OTHER PUBLICATIONS

Oshitani, et al. "Development of a Pasted Nickel Electrode with High Active Material Utilization." J. Electrochem. Soc., vol. 136, No. 6 Jun. 1989.*
International Search Report dated Feb. 28, 2006.

* cited by examiner

*Primary Examiner* — Jessica L Ward
*Assistant Examiner* — Paul Wartalowicz

(57) ABSTRACT

The present invention relates to a process for the conversion of cobalt(II)hydroxide into cobalt(III)oxidehydroxide (CoOOH) by reaction of the cobalt(II)hydroxide with oxygen in the presence of certain metal compounds. The invention further relates to the use of cobalt(III)oxidehydroxide thus prepared in the preparation of catalysts or catalysts precursors, especially catalysts or catalyst precursors for the conversion of synthesis gas into normally liquid and normally solid hydrocarbons and to normally liquid or solid hydrocarbons, optionally after additional hydrotreatment, obtained in such a conversion process.

5 Claims, No Drawings

CATALYTIC PROCESS FOR THE CONVERSION OF CO (II)HYDROXIDE IN CO (III)OXIDEHYDROXIDE

PRIORITY CLAIM

The present application claims priority to European Patent Application 04106157.3 filed 29 Nov. 2004.

FIELD OF THE INVENTION

The present invention relates to a process for the conversion of cobalt(II)hydroxide into cobalt(III)oxidehydroxide (CoOOH) by reaction of the cobalt(II)hydroxide with oxygen. The invention further relates to the use of cobalt(III) oxidehydroxide thus prepared in the preparation of catalysts or catalysts precursors, especially catalysts or catalyst precursors for the conversion of synthesis gas into normally liquid and normally solid hydrocarbons and to normally liquid or solid hydrocarbons, optionally after additional hydrotreatment, obtained in such a conversion process.

BACKGROUND OF THE INVENTION

The catalytic preparation of hydrocarbons from synthesis gas, i.e. mixture of carbon monoxide and hydrogen, is well known in the art and is commonly referred to as Fischer-Tropsch synthesis. Catalysts often used for this process comprise one or more metals, together with one or more promoters and a support or carrier material. These catalysts can be made according to one or more well known processes, for instance one or more of precipitation, impregnation, kneading, melting, extrusion and spray drying. Usually these processes are followed by drying, calcination and/or activation.

The products which can be prepared by using these catalysts usually have a very wide range of molecular weight distributions, and in addition to branched and unbranched paraffins, often contain considerable amounts of olefins and oxygen-containing organic compounds, while occasional also aromatic compounds may be formed. Most Fischer-Tropsch reaction result in the formation of longer hydrocarbon chains. Usually only a minor portion of the products obtained is made up of middle distillates, especially when relatively low temperatures are used. Of these middle distillates not only the yield but also the pour point is unsatisfactory. Hydrotreatment (hydrogenation, hydroisomerisation and/or hydrocracking) of the product or part of the product results in a larger amount of desired middle distillates with improved cold flow properties.

Supported catalysts suitable for use in the Fischer-Tropsch synthesis process typically contain a catalytically active metal of the Groups 8, 9 or 10 of the Periodic Table of the Elements. In particular, iron, nickel, cobalt and ruthenium are well known catalytically active metals for such catalysts. Reference may be made to EP-A-398420, EP-A-178008, EP-A-167215, EP-A-168894, EP-A-363537, EP-A-498976 and EP-A-71770. In recent patent publications the emphasis is on cobalt based Fischer Tropsch catalysts for the production of (very) heavy paraffinic product, followed by the hydrocracking of the Fischer Tropsch wax thus obtained to produce middle distillates (in general naphtha, kero and/or gasoil).

There is a continuous interest in finding catalysts which provide a further improved selectivity in the conversion of carbon monoxide into valuable hydrocarbons, in particular hydrocarbons containing 5 or more carbon atoms ("$C_{5+}$ hydrocarbons" hereinafter), and which minimize the formation of carbon dioxide, which is a carbon containing by-product of low value.

It has now surprisingly been found that cobalt(II)hydroxide can be converted at least partly in the presence of certain transition metals into cobalt(III)oxidehydroxide (CoOOH), which cobalt(III)oxidehydroxide, optionally in combination with unconverted cobalt(II)hydroxide and optionally in the presence of one or more promoters, can be used for the preparation of supported Fischer Tropsch catalysts which show an increased $C_{5+}$ selectivity.

SUMMARY OF THE INVENTION

Thus, the present invention relates to a process for the conversion of cobalt(II)hydroxide into cobalt(III)oxidehydroxide (CoOOH) by reaction of the cobalt(II)hydroxide with oxygen in the presence of a catalytic amount of a transition metal compound, the transition metal compound not being a cobalt compound, which transition metal in its generality has at least the valences 2 and 3. In particular, the transition metal compound in the oxidation process has the valence 2 or 3, preferably 2.

When the cobalt(III)oxidehydroxide thus prepared is used for the preparation of Fischer Tropsch catalysts, it appears that catalyst thus obtained show an increased $C_{5+}$ selectivity and/or increased activity. In addition an increased stability was obtained. Thus, it appeared possible in a two step process for the preparation of middle distillates (Fischer Tropsch followed by hydrocracking) to increase the amount of useful product of good, standard quality, and/or to increase the cold flow properties of the product. In addition, this could be done for a prolonged period. The increased $C_{5+}$ selectivity also results in a smaller amount of less valuable $C_1$ to $C_4$ products and/or carbon dioxide.

DETAILED DESCRIPTION OF THE INVENTION

Transition metals to be used in the process according to the invention are the metals of Groups 3 to 12 of the Periodic Table (new notation), including the Lanthanides and Actinides. Transition metals which in general have the valences 2 and 3, and which are very suitable for the present invention, are Ti, V, Cr, Mn, Fe, Ni, Sm, Eu and Yb. Other transition metals which in general have the valences 2 and 3 and which are very suitable for the invention are Cu, Zr, Nb, Mo, Ru, Rh, Ag, Sm, Tm, Yb, W, Re, Os, Ir, Pt and Au. Mixtures are also possible. Cobalt is not included. Preferably the transition metal is vanadium, chromium, manganese, iron, zirconium, ruthenium, rhenium or platinum, more preferably manganese, in view of the good results which can be obtained and the fact that these metals are also very suitable as promoters in the FT process. It is observed that in most cases the transition metal will end up in the cobalt(III)oxidehydroxide. Especially when the transition metal can also be used as promoter in the FT reaction, this is an additional advantage.

Especially a transition metal compound is used derived from a transition metal which is less noble than cobalt. Preferably the transition metal compound is derived from a transition metal having a standard reduction potential $E°$ ($M^{3+}+ e \leftrightarrows M^{2+}$) which is less than the standard reduction potential $E°$ of cobalt. (Handbook of Chemistry and Physics, $77^{th}$ Edition, Chapter 8, Electrochemical Series, 8-20, Table 1). The standard reduction potential $E°$ is preferably less than +1.8 V.

In the process according to the invention the transition metal (or mixture of transition metals) is typically present in a molar (or total molar) ratio of Co/transition metal of from 1000:1 to 1:1, suitably between 500:1 to 2:1, preferably 100:1 to 3:1, more preferably from 50:1 to 5:1, in views of the results which can be obtained and the fact that these amounts are also optimal for the Fischer Tropsch process.

The process according to the invention may be carried out at temperatures up to 250° C. especially up to 200° C., suitably at a temperature from 0 to 130° C., preferably 40 to 120° C., more preferably from 60 to 110° C. Lower temperatures result in a slow reaction, higher temperatures may result in the formation of $Co_3O_4$. The process is suitably carried out at a pressure between 0.1 and 50 bar, preferably between 0.5 and 5 bar. The process is especially carried out in combination with natural and/or artificial light, especially UV light. This can be done simply by allowing the reaction to be carried out in day light and/or in the presence of special lamps normally used for carrying photochemical reactions. The use of natural and/or artificial light increases the reaction velocity.

The reaction time for the process according to the invention is suitably between 0.1 h and 100 days, preferably 0.5 h and 30 days, more preferably between 2 and 24 h.

The amount of cobalt(II)hydroxide which is converted into heterogenite is suitably between 0.1 an 100 wt %, more suitably between 10 and 99 wt %, preferably between 50 and 95 wt %. The amount of $Co_3O_4$ which may be formed during the reaction is preferably less than 50 wt %, more preferably less than 10 wt %, still more preferably less than 1 wt %. $Co_3O_4$ can be formed by reaction of the heterogenite with cobalt(II)hydroxide. $Co_3O_4$ is especially formed at higher temperatures, thus a reduction in the temperature will result in less $Co_3O_4$.

The process of the invention preferably uses as transition metal compound a manganese or iron compound, preferably manganese(II)hydroxide or iron(II)hydroxide, more preferably manganese(II)hydroxide. In a special embodiment a mixture of cobalt(II)hydroxide and manganese(II)hydroxide is used, especially a co-precipitate of cobalt(II)hydroxide and manganese(II)hydroxide is used.

Suitably air is used as source for the oxygen in the claimed process, although enriched air (comprising e.g. 40 to 50 v % of oxygen) or pure oxygen may also be used. Also oxygen depleted air may be used, or mixtures of air and inert compounds, e.g. nitrogen. Suitably the relative humidity of the (enriched) air is between 10 and 90%.

The reaction is suitably carried out in the presence of water or a mixture of water and one or more alcohols, suitably methanol and/or ethanol, preferably at a pH between 2 and 10, especially between 3 and 9. Also organic acids may be used or aqueous solutions of these acids. Inorganic salts may be present, e.g. ammonium acetate, although salts which are not removed during calcination, are not preferred. In this embodiment a slurry is formed from the cobalt hydroxide, the transition metal compound and the solvent, and air/oxygen is bubbled through the slurry. In another embodiment the reaction is carried out in the solid state, i.e. in the absence of a liquid/solvent. This can be done flowing air or oxygen through a fixed bed of the mixture of the cobalt hydroxide and the transition metal compound, or the reaction can be done in a fluidized bed. In this embodiment it is preferred to add an organic acid to the solid mixture, preferably citric acid, oxalic acid or ascorbic acid. The amount of organic acid may be up to 5 wt % of the total composition, preferably 0.1 to 1 wt % of total composition. In both embodiments the transition metal compound may be homogeneously distributed in the cobalt (II)hydroxide or may be present as a coating on the cobalt(II) hydroxide.

The invention also relates to cobalt(III)oxidehydroxide or a mixture of cobalt(III)oxidehydroxide and cobalt(II)-hydroxide obtainable by a process as described above, as well as to cobalt(III)oxidehydroxide or a mixture of cobalt(III)oxidehydroxide and cobalt(II)-hydroxide obtained by a process as described above.

The cobalt(III)oxidehydroxide as prepared according to the process of the invention shows a crystal particle size which is relatively small. Most of the particles do have a size between 2 and 15 nm. As such a small crystal particle size results in a relatively large cobalt surface area which is advantageous for catalytic applications, the invention more in particular also relates to cobalt(III)oxidehydroxide or a mixture of cobalt(III)oxidehydroxide and cobalt(II)hydroxide as described above, in which the cobalt(III)oxidehydroxide or the mixture has an average particles size between 3 and 10 nm, preferably between 4 and 8 nm. For the measurement of the average particles size fines (i.e. particles having a size less than 1 nm) are excluded from the measurement. A suitable method to determine the average particle size is SEM or TEM.

In another aspect the invention concerns a process for the preparation of a supported cobalt based Fischer Tropsch catalyst or catalyst precursor, which process comprises
(a) mixing a catalyst carrier or a catalyst carrier precursor, (2) a liquid and (3) one or more cobalt compounds comprising cobalt(III)oxidehydroxide optionally in combination with cobalt(II)hydroxide and/or $Co_3O_4$ (spinel) to form a mixture,
(b) optionally shaping the mixture,
(c) drying the mixture thus obtained, and
(d) optionally calcining the composition thus obtained.

The mixing process may be any well known process in the art. Depending on the drying process (for instance spray drying process of a slurry vs. drying a past like composition) different ratio's of liquid/solids may be used. The liquid is preferably water, but also $C_1$-$C_4$ alcohols may be used, especially methanol or ethanol. Also ethers, e.g. MTBE, and ketones, e.g. acetone or MEK, may be used. Mixtures are also possible. The process may further comprise one or more techniques well known in the art as kneading, melting, extrusion and/or spray drying. The solids content of the mixture is suitably between 2 and 90 wt % of the total composition, preferably between 5 and 80 wt %. When spray drying techniques are to be used, the solids content is preferably between 5 and 20 wt %. When extrusion techniques are to be involved, the solid content is preferably between 50 and 80 wt %.

In the process to prepare Fischer Tropsch catalysts the amount of cobalt(III)oxidehydroxide in the cobalt compounds (cobalt(III)oxidehydroxide, cobalt(II)hydroxide and $Co_3O_4$) is suitably between 5 and 100 wt % based on total weight of cobalt compounds, preferably between 25 and 100 wt %, more preferably between 50 and 95 wt %. Usually the cobalt compounds will be present in an amount of 2 to 60 wt %, based on the weight of metallic cobalt on carrier or dried carrier precursor, preferably between 10 and 40 wt %.

Suitable carriers or catalyst carrier precursors for the process to prepare Fischer Tropsch catalysts are refractory oxides, preferably silica, alumina, zirconia, titania or mixtures thereof, or precursors therefore.

Suitable promoter metals for the process to prepare Fischer Tropsch catalysts may be chosen from vanadium, chromium, manganese, iron, zirconium, ruthenium, rhenium and platinum, each promoter metal preferably used in such an amount that the atomic ratio of cobalt:promoter metal is from 1000:1 to 3:1, preferably 200:1 to 4:1, more preferably from 100:1 to 6:1. Preferably the promoter metal is manganese, rhenium or platinum.

In the process to prepare Fischer Tropsch catalysts very suitably cobalt(III)oxidehydroxide is used or a mixture of cobalt(III)oxidehydroxide and cobalt(II)hydroxide and optionally $Co_3O_4$, preferably cobalt(III)oxidehydroxide or the mixture as prepared in any of the process described hereinbefore.

In another embodiment of the invention the process to convert cobalt(II)hydroxide into cobalt(III)oxidehydroxide is carried out by first making a mixture of cobalt(II)-hydroxide, a transition metal as defined hereinbefore and a catalyst carrier or catalyst carrier precursor followed by conversion of the cobalt(II)hydroxide into cobalt(III)oxidehydroxide. The preferred embodiments as described above for the general process also apply to this embodiment.

In the process to prepare the Fischer Tropsch catalyst the mixing step is a simple mixing step or a kneading or mulling step. In another embodiment the shaping step comprises palletising, extrusion, granulating or crushing, preferably extrusion.

In the process to prepare the Fischer Tropsch catalyst the mixture suitably has a solids content in the range of from 30 to 90 wt %, preferably of from 50 to 80 wt %, based on total composition. Such a mixture is especially suitable for a palletising, extrusion, granulating or crushing step.

In another process to prepare the Fischer Tropsch catalyst, the shaping step is a spray drying process. In this embodiment the mixture has a solids content of from 1 to 30 wt % based on total composition, preferably of from 5 to 20 wt %.

The shaped and dried mixture as described above for the preparation of the Fischer Tropsch catalyst is suitably calcined, preferably at a temperature between 300 and 900° C., more preferably between 450 and 600° C.

In the case that the process results in relatively large particles, as is usually the case when an extrusion process is used, the product obtained may be ground till an average particle size of between 5 and 500 micron, preferably between 10 and 100 micron. Thus, catalyst particles are obtained which are especially suitable for a slurry Fischer Tropsch process.

The invention also relates to the Fischer Tropsch catalyst or catalyst precursor obtainable by a process as described hereinbefore.

The invention also relates to an activated catalyst suitable for the production of hydrocarbons from synthesis gas obtained by reduction with hydrogen or a hydrogen containing gas of a Fischer Tropsch catalyst precursor as described hereinbefore or obtainable by a process as described hereinbefore. Further, the invention also concerns the process for the preparation of hydrocarbons, comprising contacting a mixture of carbon monoxide and hydrogen with a catalyst as described hereinbefore, especially with an activated catalyst, optionally followed by hydroconversion.

Preferred hydrocarbonaceous feeds for the preparation of synthesis gas are natural gas or associated gas. As these feedstocks usually result in synthesis gas having $H_2/CO$ ratio's of close to 2, cobalt is a very good Fischer-Tropsch catalyst as the user ratio for this type of catalysts is also close to 2.

The catalytically active metal is preferably supported on a porous carrier as discussed in detail before. In general, the porous carrier may be selected from any of the suitable refractory metal oxides or silicates or combinations thereof known in the art. Particular examples of preferred porous carriers include silica, alumina, titania, zirconia, ceria, gallia and mixtures thereof, especially silica, alumina and titania, especially $TiO_2$.

If desired, the catalyst may also comprise one or more metals or metal oxides as promoters. Suitable metal oxide promoters may be selected from Groups IIA, IIIB, IVB, VB, VIB or Group VIIB of the Periodic Table of the Elements, or the actinides and lanthanides.

In particular, oxides of magnesium, calcium, strontium, barium, scandium, yttrium, lanthanum, titanium, zirconium, hafnium, cerium, thorium, uranium, vanadium, chromium and manganese are very suitable promoters. Particularly preferred metal oxide promoters for the catalyst used to prepare heavy paraffins are manganese, vanadium and zirconium oxide.

Suitable metal promoters may be selected from Groups VIIB or VIII of the Periodic Table of the Elements. Rhenium, silver and Group VIII noble metals are particularly suitable, with platinum and palladium being especially preferred.

The most preferred promoters are selected from vanadium, manganese, rhenium, zirconium and platinum in view of their ability to produce long chain n-paraffins.

The promoter, if present, may be deposited on the carrier material by any suitable treatment, such as impregnation, mixing/kneading and mixing/extrusion. It is especially preferred to select a promoter material which is used in the conversion of the cobalt(II)hydroxide into cobalt(III)oxidehydroxide as well is used as promoter for the Fischer Tropsch reaction.

After calcination, the resulting catalyst may be activated by contacting the catalyst with hydrogen or a hydrogen-containing gas, typically at temperatures of about 200 to 350° C.

The suitable material for the shaped catalyst particles should be processed in such a way that their intended shape is obtained.

One example of a processing method is an extrusion process, wherein a shapable dough, preferably comprising one or more sources for one or more of the catalytically active elements, and optionally one or more sources for one or more of the promoters and the finely divided refractory oxide or refractory oxide precursor is mulled together with a suitable solvent. The mulled mixture is then extruded through an orifice in a die-plate. The resulting extrudates are dried.

The solvent for inclusion in the mixture may be any of the suitable solvents known in the art. Examples of suitable solvents include water; alcohols, such as methanol, ethanol and propanol; ketones, such as acetone; aldehydes, such as propanal; and aromatic solvents, such as toluene. A most convenient and preferred solvent is water, optionally in combination with methanol.

The use of specific die-plates enables the formation of the intended shape of the catalyst particles. Die-plates are well known in the art and can be made from metal or polymer material, especially a thermoplastic material.

The catalytic conversion process may be performed under conventional synthesis conditions known in the art.

Typically, the catalytic conversion may be effected at a temperature in the range of from 150 to 300° C., preferably from 180 to 260° C.

Typical total pressures for the catalytic conversion process are in the range of from 1 to 200 bar absolute, more preferably from 10 to 70 bar absolute.

In the catalytic conversion process especially more than 75 wt % of $C_{5+}$, preferably more than 85 wt % $C_{5+}$ hydrocarbons are formed.

Depending on the catalyst and the conversion conditions, the amount of heavy wax ($C_{20+}$) may be up to 60 wt %, sometimes up to 70 wt %, and sometimes even up till 85 wt %.

Preferably a cobalt catalyst is used, a low $H_2/CO$ ratio is used (especially 1.7, or even lower) and a low temperature is used (190-230° C.).

To avoid any coke formation, it is preferred to use an $H_2/CO$ ratio of at least 0.3. It is especially preferred to carry out the Fischer-Tropsch reaction under such conditions that the SF-alpha value, based on the obtained saturated linear $C_{20}$ hydrocarbon fraction and the obtained saturated linear hydrocarbon $C_{40}$ fraction, is at least 0.925, preferably at least 0.935, more preferably at least 0.945, even more preferably at least 0.955. Preferably the Fischer-Tropsch hydrocarbons stream comprises at least 35 wt % $C_{30+}$, preferably 40 wt %, more preferably 50 wt %.

The Fischer-Tropsch process may be a slurry FT process or a fixed bed FT process, especially a multitubular fixed bed.

Example

A co-precipitate of cobalt(II)hydroxide and manganese(II)hydroxide (molecular ratio 95:5, pink colored) was contacted with air in the presence of daylight for twenty days. Analysis of the (black) sample showed that 80 wt % of the cobalt(II)hydroxide was converted into cobalt(III)oxidehydroxide. A second sample, only comprising cobalt(II)hydroxide (i.e. without any extra transition metal) did not show any changes.

Two catalysts were prepared, one based on the starting cobalt(II)hydroxide/manganese(II)hydroxide as described above and one based on the above prepared sample containing the cobalt(III)oxidehydroxide. The catalysts were prepared by mixing the cobalt compounds, titania and some water, followed by extrusion of the mixture, drying the extrudates and activation with a hydrogen containing gas. The two catalysts were tested under similar conditions in a fixed bed Fischer Tropsch experiment. Under the same conditions (GHSV 1200, 200° C.) the cobalt(II)hydroxide based catalyst showed a space time yield of 149 g/l/h, while the cobalt(III)oxidehydroxide showed a space time yield of 153 g/l/h. The $C_{5+}$ selectivity for the first catalyst was 93.3 wt %, for the second catalyst 95.6 wt %. Thus, the cobalt(III)oxidehydroxide based catalyst showed an increased yield of 2.6%, and a selectivity improvement of 2.3 wt %

We claim:

1. A process for the preparation of a supported, cobalt based Fischer Tropsch catalyst or catalyst precursor, which process comprises
    (a) mixing a (1) catalyst carrier or a catalyst carrier precursor, (2) a liquid and (3) cobalt(III)oxidehydroxide; and
    (b) shaping and drying the mixture thus obtained;
wherein the cobalt(III)oxidehydroxide is formed by mixing cobalt(II)hydroxide with a transition metal compound, the transition metal compound not being a cobalt compound, and reacting the cobalt(II)hydroxide with oxygen.

2. A process according to claim 1 wherein the mixing step of cobalt(II)hydroxide with a transition metal compound comprises coprecipitation of the cobalt(II)hydroxide and the transition metal compound.

3. A process according to claim 1, in which the catalyst precursor further comprises a promoter metal or metal compound, the metal selected from the group consisting of vanadium, chromium, manganese, iron, zirconium, ruthenium, rhenium and platinum.

4. A process according to claim 3, in which the atomic ratio of cobalt:promoter is from 200:1 to 4:1.

5. A process according to claim 3, in which the atomic ratio of cobalt:promoter is from 100:1 to 6:1.

* * * * *